US009178435B2

(12) United States Patent
Nishimura (10) Patent No.: US 9,178,435 B2
(45) Date of Patent: Nov. 3, 2015

(54) SWITCHING POWER SUPPLY (75) Inventor: Tsuguo Nishimura, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 132 days.

(21) Appl. No.: 14/128,327

(22) PCT Filed: Jul. 20, 2012

(86) PCT No.: PCT/JP2012/068434
§ 371 (c)(1),
(2), (4) Date: Dec. 20, 2013

(87) PCT Pub. No.: WO2013/015214
PCT Pub. Date: Jan. 31, 2013

(65) Prior Publication Data
US 2014/0140103 A1 May 22, 2014

(30) Foreign Application Priority Data

Jul. 25, 2011 (JP) ................................ 2011-162196

(51) Int. Cl.
*H02M 3/335* (2006.01)
(52) U.S. Cl.
CPC ...... *H02M 3/33546* (2013.01); *H02M 3/33592* (2013.01); *Y02B 70/1475* (2013.01)
(58) Field of Classification Search
CPC ... H02M 1/36; H02M 3/3378; Y02B 70/1475
USPC ......... 363/16–20, 21.07, 21.08, 21.12, 21.18, 363/56.01, 65, 53; 361/42, 44, 25, 84, 111, 361/115
See application file for complete search history.

(56) References Cited

U.S. PATENT DOCUMENTS

| | | | | |
|---|---|---|---|---|
| 5,642,267 A | * | 6/1997 | Brkovic et al. | 363/16 |
| 5,910,886 A | * | 6/1999 | Coleman | 363/17 |
| 5,923,547 A | * | 7/1999 | Mao | 363/52 |
| 2010/0246215 A1 | | 9/2010 | Mase et al. | |

FOREIGN PATENT DOCUMENTS

| | | |
|---|---|---|
| JP | A-2002-262560 | 9/2002 |
| JP | A-2005-137178 | 5/2005 |

(Continued)

OTHER PUBLICATIONS

Sep. 11, 2012 International Search Report issued in International Patent Application No. PCT/JP2012/068434.

*Primary Examiner* — Rajnikant Patel
(74) *Attorney, Agent, or Firm* — Oliff PLC (57) ABSTRACT

A switching power supply is provided including a transformer that transforms an AC voltage converted by a bridge circuit, and outputs the transformed voltage from a center tap between secondary coils, and two second switches that respectively cause both ends of the secondary coils to be brought in contact with and be separated from a fixed electrical potential. By the second switches being switched on/off, the switching power supply outputs the rectified DC voltage from the center tap. The switching power supply further includes two diodes connected to the both ends of the secondary coils, and cause the currents to flow from the both ends, a capacitor that stores the currents caused to flow, and a third switch that is connected between the capacitor and the center tap, in which, by the third switch being turned on, the capacitor is discharged to the smoothing circuit.

4 Claims, 9 Drawing Sheets

(56) References Cited

FOREIGN PATENT DOCUMENTS

| | | |
|---|---|---|
| JP | A-2006-211880 | 8/2006 |
| JP | A-2007-274789 | 10/2007 |
| JP | A-2008-43092 | 2/2008 |
| JP | A-2010-226931 | 10/2010 |

* cited by examiner

SWITCHING POWER SUPPLY

This application is the national phase of PCT International Application No. PCT/JP2012/068434 that has an International filing date of Jul. 20, 2012 and designated the United States of America and claims priority to Japanese Patent App. No. JP 2011-162196 that was filed on Jul. 25, 2011.

BACKGROUND

Figure 11:
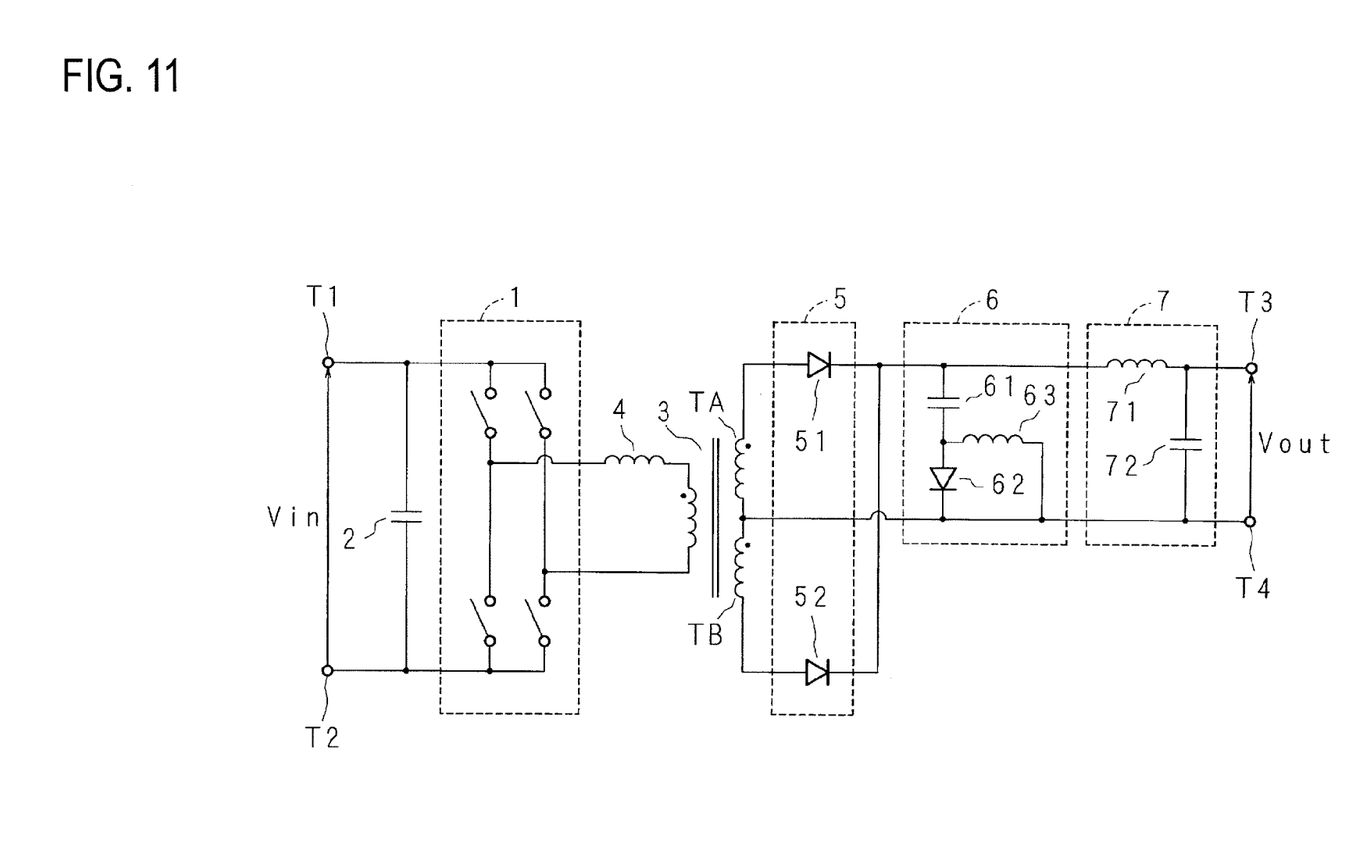
FIG. 11 is a circuit diagram illustrating an example of a configuration of a switching power supply apparatus.

FIG. 11 is a circuit diagram illustrating an example of a configuration of a switching power supply apparatus disclosed in JP 2005-137178A. In this switching power supply apparatus, an inverter 1 that includes an H-shaped bridge constituted by four switches converts a DC voltage Vin applied to input terminals T1, T2 that are provided at both ends of a capacitor 2 into an AC voltage. A resonant inductor 4 and a primary coil of a transformer 3 are connected in series to a bridging portion of the H-shaped bridge, and thus the AC voltage converted by the inverter 1 is transformed by the transformer 3, and the transformed AC voltage is rectified by a rectification circuit 5.

The rectification circuit 5 includes a diode 51 whose anode is connected to one terminal TA of secondary coils of the transformer 3, and a diode 52 whose anode is connected to another terminal TB of the secondary coils. Cathodes of the diodes 51, 52 are connected to each other. The rectification circuit 5 outputs the rectified DC voltage to a snubber circuit 6 from the cathodes of the diodes 51, 52 that are connected to each other.

In the snubber circuit 6, one terminal of a capacitor 61 is connected to the cathodes of the diodes 51, 52 that are connected to each other, and the other terminal of the capacitor 61 is connected to an anode of a diode 62 and to one terminal of a regenerative inductor 63. A cathode of the diode 62 and the other terminal of the regenerative inductor 63 are connected to the center tap between the secondary coils of the transformer 3.

The DC voltage in which surge voltages are absorbed and reduced by the snubber circuit 6 is smoothed by a smoothing circuit 7, and the smoothed DC voltage Vout is output from output terminals T3, T4. In the smoothing circuit 7, one terminal of an inductor 71 is connected to the one terminal of the capacitor 61 of the snubber circuit 6, and the other terminal of the inductor 71 is connected to the output terminal T3 and to one terminal of a capacitor 72. The other terminal of the capacitor 72 is connected to the output terminal T4 and the center tap between the secondary side coils of the transformer 3.

In the switching power supply apparatus having such a configuration, the capacitor 61 of the snubber circuit 6 and the resonant inductor 4 provided on the primary side of the transformer 3 constitute an LC serial resonance circuit, which enables suppression of a surge voltage that is applied to the diodes 51, 52 of the rectification circuit 5.

SUMMARY

Problem to be Solved

In the switching power supply apparatus as described above, suppressing a surge voltage by the snubber circuit 6 prevents the diodes 51, 52 of the rectification circuit 5 from being damaged. However, if such a switching power supply apparatus is applied to a high current DC/DC converter, there is the problem that, since the secondary coils of the transformer 3 that causes a surge voltage have a high inductance, a high current flows through the regenerative inductor 63 of the snubber circuit 6, resulting in high loss in the regenerative inductor 63.

It is an object to provide a switching power supply that has low loss and a few constituent components, and is capable of suppressing a surge voltage.

Solution to Problem

A switching power supply according to a first embodiment includes: a bridge circuit that includes a plurality of switches, and is configured to convert an input DC voltage into an AC voltage by switching; a transformer to whose primary coil the AC voltage converted by the bridge circuit is applied, and that is configured to output the transformed voltage from a center tap between secondary coils of the transformer; two second switches for respectively causing two ends of the secondary coils to be brought in contact with and be separated from a fixed electrical potential, and a smoothing circuit that smoothes the voltage output from the center tap, wherein a rectified DC voltage is output from the center tap by the second switches being respectively switched on/off with control signals synchronized with the switching, and the DC voltage smoothed by the smoothing circuit is output from the switching power supply, the switching power supply further including: two diodes that are respectively connected to the two ends of the secondary coils, and are configured to cause currents to flow from the two ends; a capacitor that stores the currents caused to flow by the diodes; and a third switch that is connected between the capacitor and the center tap, wherein the capacitor is discharged to the smoothing circuit by the third switch being turned on with a second control signal synchronized with the switching.

In the switching power supply, the bridge circuit that includes a plurality of switches converts an input DC voltage into an AC voltage by switching, and the transformer to whose primary coil the AC voltage converted by the bridge circuit is applied outputs the transformed voltage from the center tap between the secondary coils. The two second switches respectively cause two ends of the secondary coils to be brought in contact with and be separated from a fixed electrical potential, and the smoothing circuit smoothes the voltage output from the center tap. The second switches are respectively switched on/off with the control signals synchronized with the switching of the bridge circuit and thereby output the rectified DC voltage from the center tap between the secondary coils, and the smoothing circuit outputs the smoothed DC voltage. The two diodes that are connected to the two ends of the secondary coils respectively cause currents to flow from the two ends of the secondary coils, and the capacitor stores the currents caused to flow by the two diodes. The third switch that is connected between the capacitor and the center tap between the secondary coils is turned on by the second control signal synchronized with the switching of the bridge circuit, and thereby the capacitor is discharged to the smoothing circuit.

The switching power supply according to a second embodiment is configured such that the second control signal is generated based on switched parts of the control signals.

In this switching power supply, the second control signal that turns the third switch on/off is generated based on the switched parts of the control signals of the second switches.

A switching power supply according to a third embodiment includes: a bridge circuit that includes a plurality of switches, and is configured to convert an input DC voltage into an AC voltage by switching; a transformer to whose primary coil the AC voltage converted by the bridge circuit is applied, and that is configured to output the transformed voltage from a center tap between secondary coils of the transformer; two diodes whose cathodes are connected to two ends of the secondary coils and whose anodes are connected to a fixed electrical potential; and a smoothing circuit that smoothes the voltage output from the center tap, wherein the DC voltage smoothed by the smoothing circuit is output from the switching power supply, the switching power supply further including: two second diodes that are respectively connected to the two ends of the secondary coils, and are configured to cause currents to flow from the two ends; a capacitor that stores the currents caused to flow by the second diodes; and a second switch that is connected between the capacitor and the center tap, wherein the capacitor is discharged to the smoothing circuit by the second switch being turned on in synchronization with the switching.

In this switching power supply, the bridge circuit including a plurality of switches converts an input DC voltage into an AC voltage by switching, and the transformer to whose primary coil the AC voltage converted by the bridge circuit is applied outputs the converted voltage from the center tap between the secondary coil. The cathodes of the two diodes are connected to the two ends of the secondary coils, and the anodes of the two diodes are connected to a fixed electrical potential, and the smoothing circuit smoothes the voltage output from the center tap between the secondary coils, and outputs the smoothed DC voltage. The two second diodes respectively connected to the two ends of the secondary coils cause currents to flow from the two ends of the secondary coils, and the capacitor stores the currents caused to flow by the second diodes. The second switch connected between the capacitor and the center tap between the secondary coils is turned on in synchronization with the switching of the bridge circuit, and thereby the capacitor is discharged to the smoothing circuit.

The switching power supply according to a fourth embodiment is configured such that the smoothing circuit is provided with a coil that smoothes a current from the center tap, and the second switch is turned on by a voltage between both ends of the coil.

In this switching power supply, the smoothing circuit is such that the coil smoothes the current flowing from the center tap between the secondary coils, and the second switch is turned on by the voltage between both ends of the coil.

Advantageous Effects

According to the switching power supply, it is possible to realize a switching power supply that has low loss and a few constituent components, and is capable of suppressing a surge voltage.

DETAILED DESCRIPTION OF THE EMBODIMENTS

Hereinafter, embodiments will be described with reference to the accompanied drawings.

Embodiment 1

Figure 1:
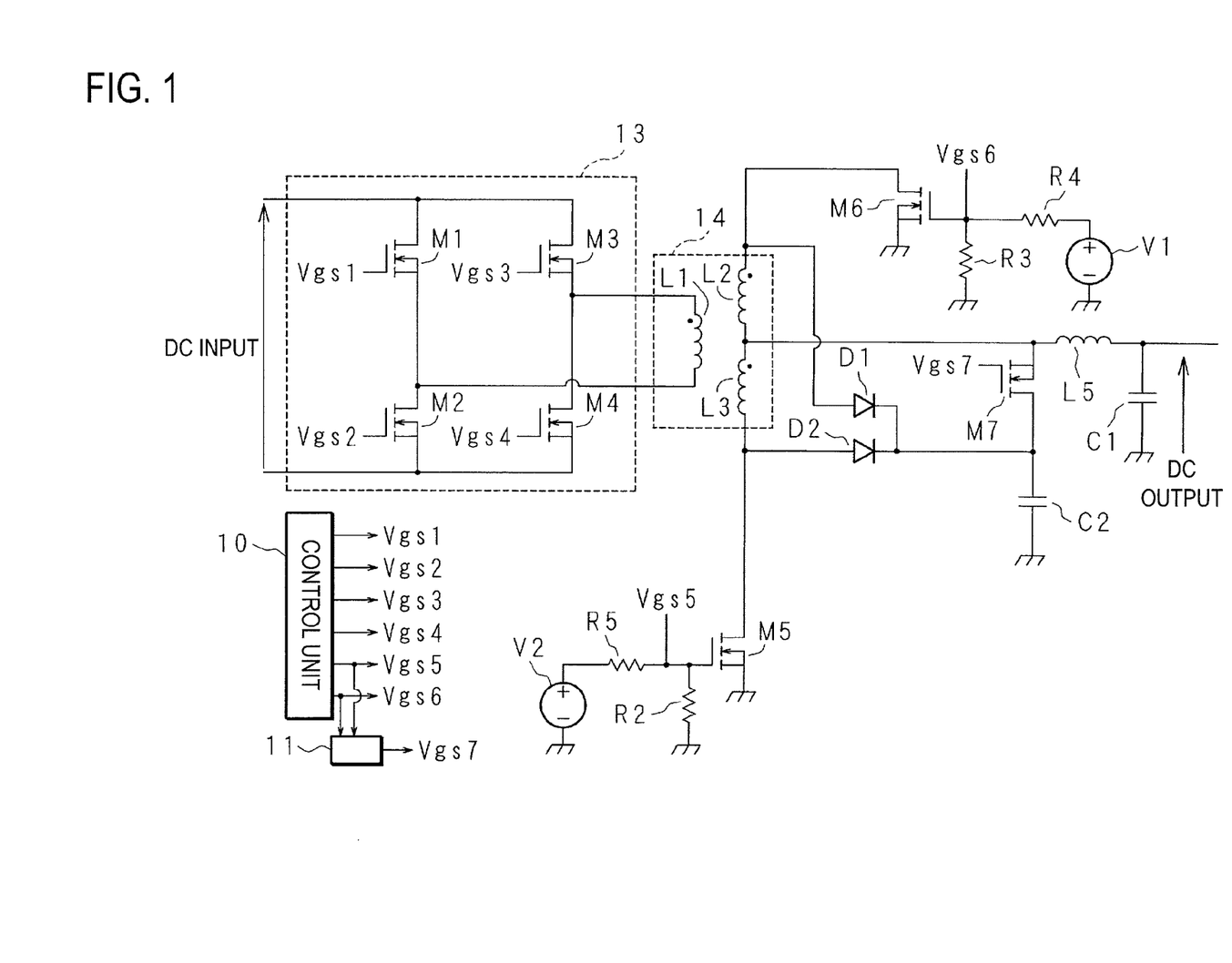
FIG. 1 is a circuit diagram illustrating a configuration of a main portion of a switching power supply according to an embodiment.

FIG. 1 is a circuit diagram illustrating a configuration of a main portion of a switching power supply according to Embodiment 1.

This switching power supply is provided with an H-shaped bridge circuit 13 that is constituted by four N-channel MOS Field-Effect Transistors (FETs, switches) M1 to M4, and converts an applied DC voltage into an AC voltage. The bridge of the H-shaped bridge circuit 13 is constituted by a primary coil L1 of a transformer 14, and the secondary coil of the transformer 14 is constituted by two coils L2 and L3 that are separated from each other by a center tap.

First ends of the respective coils L2 and L3 are connected to each other by the center tap, and second ends of the respective coils L2 and L3 are connected to the drains of rectifying devices (second switches) M6 and M5, which are N-channel MOSFETs.

The source of the rectifying device M6 is grounded, and the gate of the rectifying device M6 is grounded via a resistance R3 and connected to a constant-voltage source V1 via a resistance R4.

The source of the rectifying device M5 is grounded, and the gate of the rectifying device M5 is grounded via a resistance R2 and connected to a constant-voltage source V2 via a resistance R5.

The second ends of the respective coils L2 and L3 are also connected to the anodes of diodes D1, D2, and the cathodes of the diodes D1, D2 are both connected to one terminal of a capacitor C2. The other terminal of the capacitor C2 is grounded.

The one terminal of the capacitor C2 is also connected to the drain of an N-channel MOSFET (third switch) M7, and the source of the FET M7 is connected to the center tap between the secondary coils L2 and L3 of the transformer 14.

The diodes D1 and D2, the capacitor C2, and the FET M7 constitute a snubber circuit for absorbing a surge that originates from the secondary coils L2 and L3 of the transformer 14.

The center tap between the secondary coils of the transformer 14 is also connected to one terminal of a choke coil (coil) L5, and the other terminal of the choke coil L5 is connected to one terminal of a capacitor C1. The other terminal of the capacitor C1 is grounded.

The choke coil L5 and the capacitor C1 constitute a smoothing circuit, and the DC voltage smoothed by the smoothing circuit is output from the two terminals of the capacitor C1, as an output voltage of the switching power supply.

Control signals are supplied to the gates of the FETs M1 to M4 and to the gates of the rectifying devices M5, M6 from a control unit 10. The control signals that are supplied to the rectifying devices M5, M6 from the control unit 10 are also supplied to a control signal generation unit 11, and the control signal generation unit 11 generates a control signal for the FET M7 based on the supplied control signals, and supplies the generated control signal to the gate of the FET M7.

Figure 2:
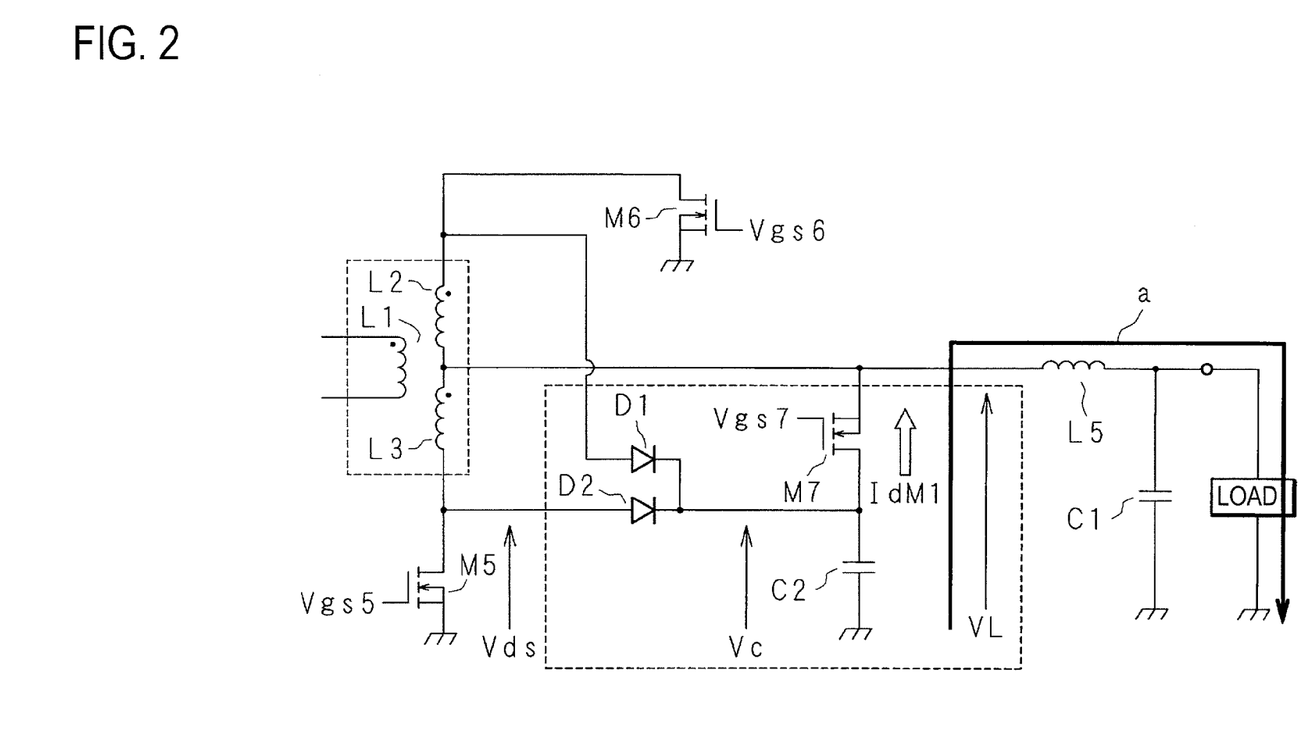
FIG. 2 is a diagram illustrating an example of operation of the switching power supply.
Figure 3:
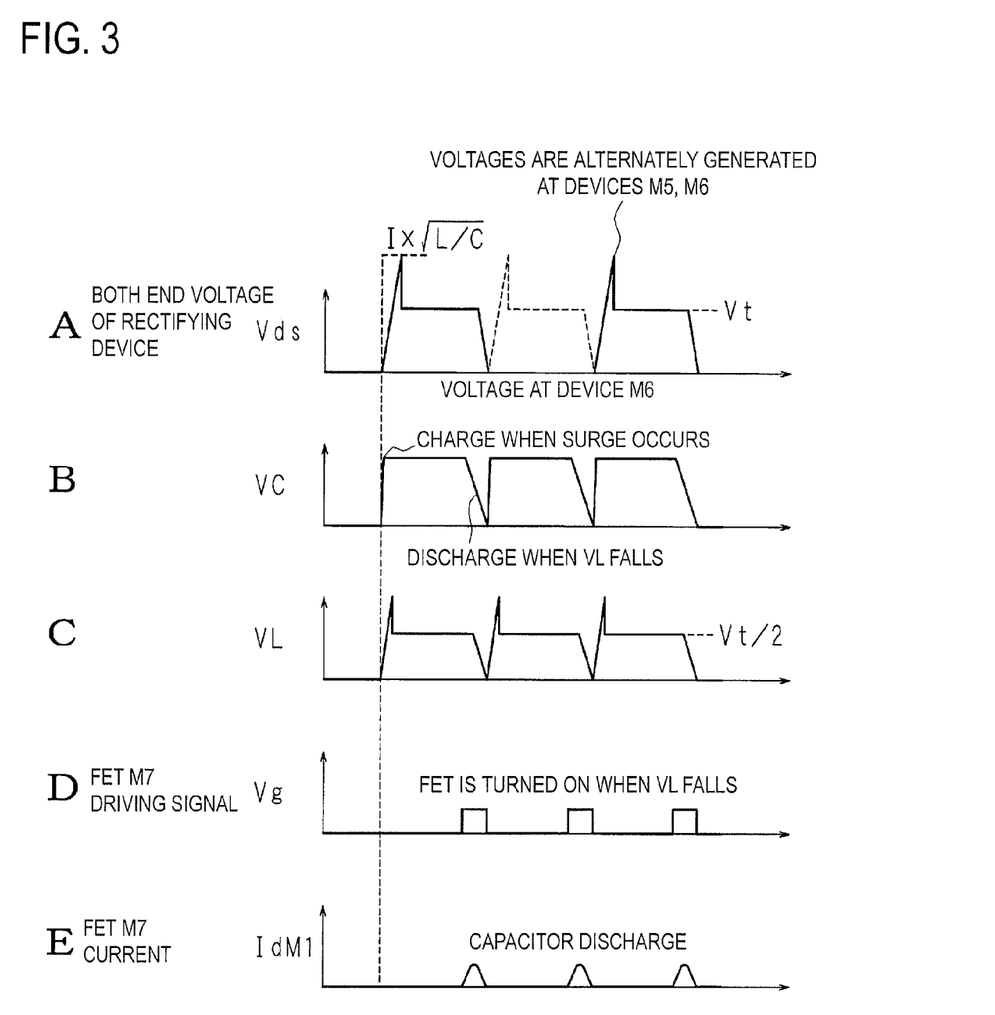
FIG. 3 shows timing flowcharts illustrating examples of operation of the switching power supply.

The following will describe an example of operation of the switching power supply having such a configuration, with reference to the diagram of FIG. 2, and the timing flowchart of FIG. 3.

In the H-shaped bridge circuit 13, the FETs M1 and M4, and the FETs M2 and M3 are switched on/off at a predetermined cycle by the control signals of the control unit 10. Accordingly, an AC voltage (current) is generated in the primary coil L1 of the transformer 14 at a predetermined cycle, thereby inducing—at the secondary coils L2 and L3—AC voltages that correspond to the winding ratios of the secondary coils.

Here, when the rectifying devices M6, M5 are turned on at timings at which voltages at the ends of the secondary coils L2 and L3 that are not on the center tap side respectively show negative values, currents flow to the secondary coils L2 and L3 from the ground sides, and the voltages at the ends of the secondary coils L2 and L3 are maintained at approximately 0 V. Therefore, the voltage of the center tap increases by the voltages at the ends that should have been negative values, and a full-wave rectified DC voltage is generated at the center tap.

As shown in FIG. 3A, surges occur in a drain-to-source voltage Vds of the rectifying device M5 at that time, for example, on the positive voltage side at timings at which the FETs M1 and M4 and the FETs M2 and M3 are switched on/off and the direction of the current of the primary coil L1 is switched. The surge voltage is expressed by $I \times \sqrt{L/C}$, where I represents the current that flows through the secondary coils L2 and L3, L represents a combined inductance of the secondary coils L2 and L3, and C represents a combined capacitance of the secondary coils L2 and L3.

Note that, as shown in FIG. 3C, the voltage VL of the center tap between the secondary coils L2 and L3 is half as high as the drain-to-source voltage Vds (=Vt) of the rectifying device M5 (FIG. 3A).

When a surge voltage occurs, the current that includes the surge voltage flows through the diode D2 and is stored in the capacitor C2, and a charged voltage VC that is charged in the capacitor C2 changes as shown in FIG. 3B. The capacitor C2 immediately takes on a fully charged state and thereafter no voltage is charged until the capacitor C2 is discharged.

The capacitor C2 needs to discharge the charged voltage by the time when the direction of the current of the primary coil L1 is next switched and a surge occurs in the drain-to-source voltage Vds of the rectifying device M6 on the positive voltage side.

In order to do so, as shown in FIG. 3D, when the voltage VL (FIG. 3C) of the center tap between the secondary coils L2 and L3 falls, the control signal generation unit 11 generates a driving signal Vg for the FET M7 and supplies the generated driving signal to the gate of the FET M7. The FET M7 is turned on when the source voltage (voltage VL of the center tap) falls to a voltage that is lower than the gate voltage (Vg).

Therefore, as shown by an arrow a of FIG. 2, the capacitor C2 discharges the current via the FET M7 and the choke coil L5, and the discharge current IdM1 of the capacitor C2 flows as shown in FIG. 3E. This means that the energy of the surge voltage stored in the capacitor C2 is emitted as an output of the switching power supply when the current flows back to the choke coil L5, thereby preventing an increase in loss and suppressing a surge voltage.

The FET M7 will have already been turned off by the time when the direction of the current of the primary coil L1 is next switched and a surge occurs in the drain-to-source voltage Vds of the rectifying device M6 on the positive voltage side, and a charge that includes the surge voltage is stored in the capacitor C2.

Figure 4:
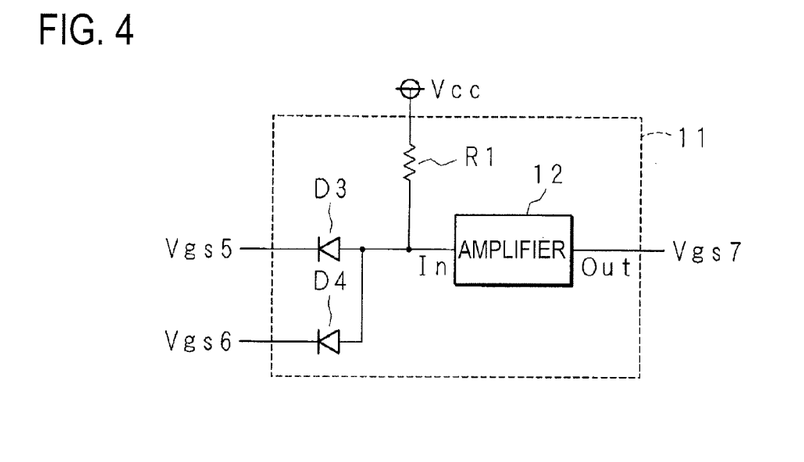
FIG. 4 is a block diagram illustrating an example of a configuration of a control signal generation unit.

FIG. 4 is a block diagram illustrating an example of a configuration of the control signal generation unit 11.

The control signal generation unit 11 includes a diode D3 to whose cathode the control signal Vgs5 for the rectifying device M5 is supplied, and a diode D4 to whose cathode the control signal Vgs6 of the rectifying device M6 is supplied.

The control signal generation unit 11 further includes an amplifier 12 that is provided with an input terminal to which both the anodes of the diodes D3, D4 are connected and that is pull up by an electronic supply voltage Vcc via a resistance R1. The amplifier 12 outputs the control signal Vgs7 (Vg) for the FET M7 from an output terminal of the amplifier 12.

Figure 5:
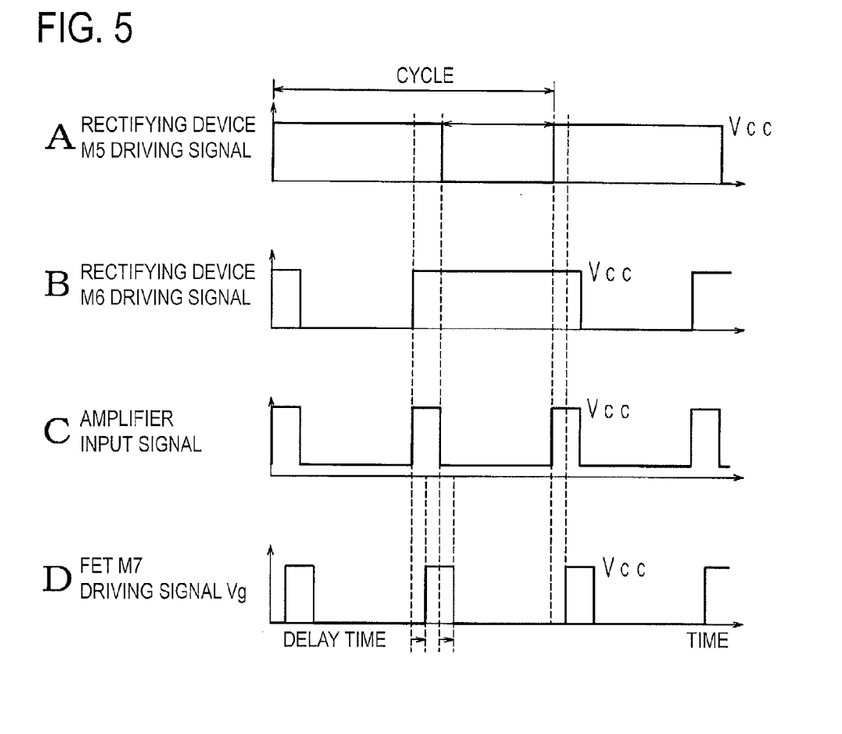
FIG. 5 shows timing flowcharts illustrating examples of operation of the control signal generation unit.

FIG. 5 shows timing flowcharts illustrating examples of operation of the control signal generation unit 11.

As shown in FIGS. 5A and 5B, the control signals (driving signals) Vgs5, Vgs6 for the rectifying devices M5, M6 are repeatedly switched on/off in cycles that are shifted with respect to each other by approximately a half cycle, but in which a front edge portion of an ON signal overlaps with a back edge portion of another ON signal.

The diodes D5, D6 and the resistance R1 constitute an AND circuit and, as shown in FIG. 5C, when any one of the control signals Vgs5 and Vgs6 is in an OFF state, the input signal of the amplifier 12 is also in the OFF state due to a voltage drop caused by the resistance R1.

When both control signals Vgs5, Vgs6 are in an ON state (Vcc), and the front edge portion of one ON signal overlaps with the back edge portion of the other ON signal, no voltage drop is caused by the resistance R1, and the input signal of the amplifier 12 is in the ON state (Vcc) (see FIG. 5C). The amplifier 12 causes, as shown in FIG. 5D, this ON signal to be delayed by a predetermined time, and outputs the delayed ON signal as the control signal (driving signal) Vgs7 for the FET (switch device) M7.

Figure 6:
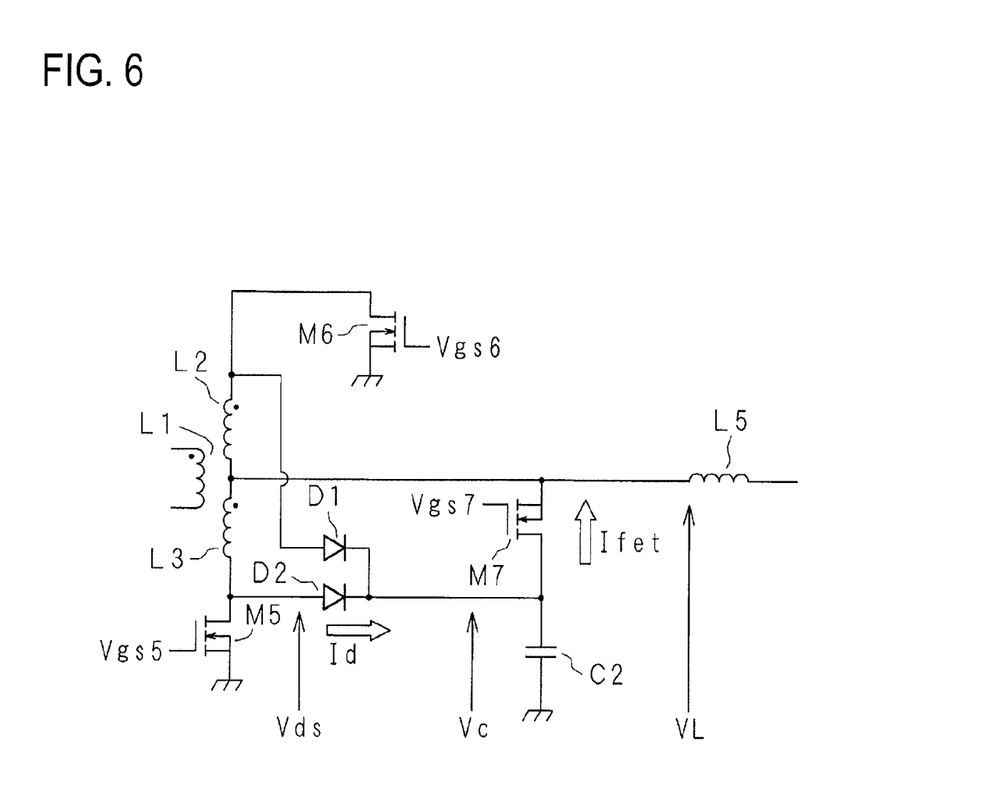
FIG. 6 is a diagram illustrating an example of the actual operation of the switching power supply illustrated in FIG. 1.
Figure 7:
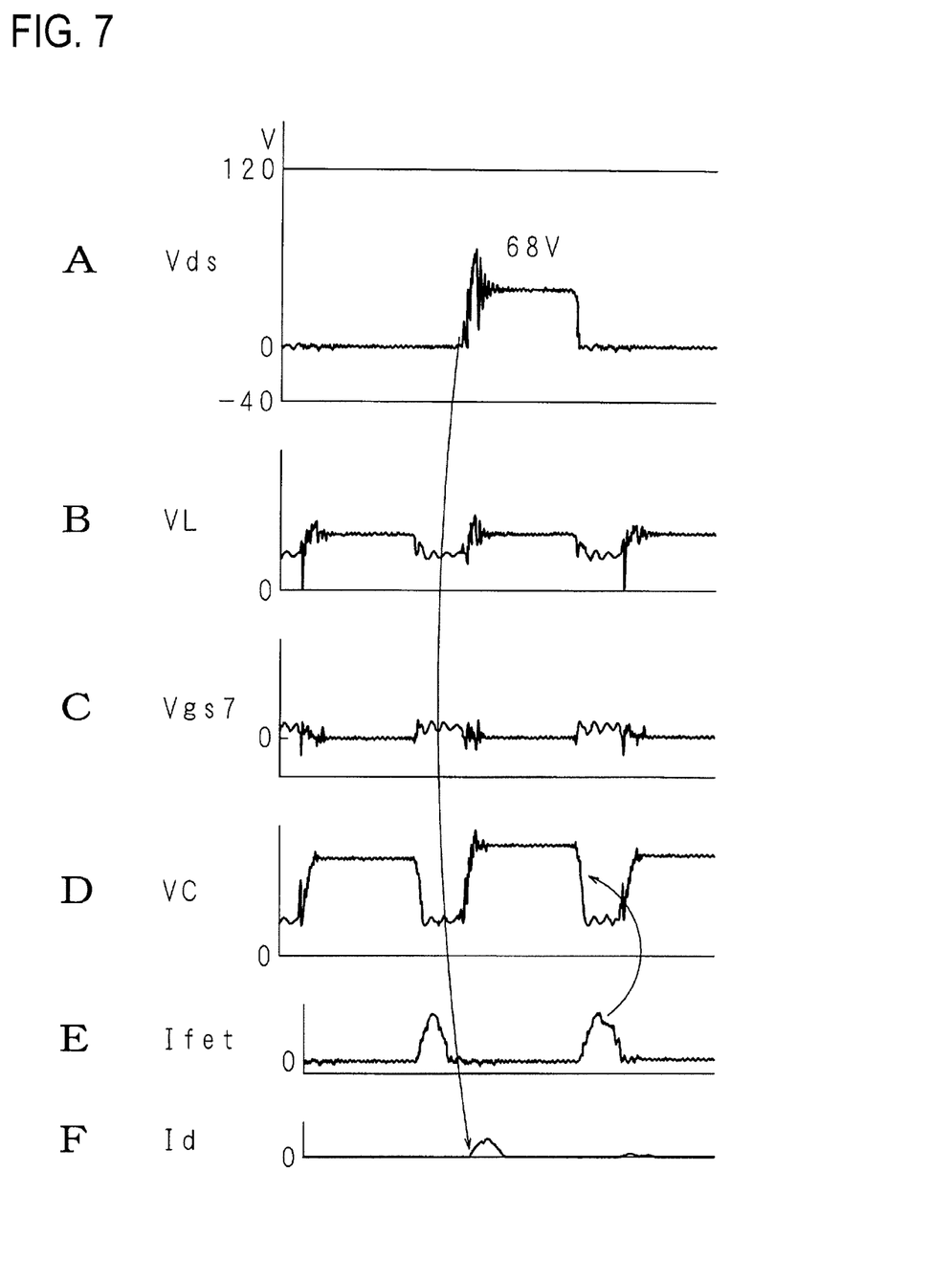
FIG. 7 shows waveform charts illustrating examples of the actual operation of the switching power supply illustrated in FIG. 1.

FIG. 6 is a diagram illustrating an example of actual operation of the switching power supply shown in FIG. 1. FIG. 7 shows waveform charts illustrating examples of this operation. Note that, in this case, a voltage that is input to the bridge circuit 13 is 288 V, and a current that is output from the switching power supply is 100 A.

As shown in FIG. 7A, when a surge occurs in the drain-to-source voltage Vds of the rectifying device M5, the control signal Vgs7 (FIG. 7C) for the FET M7 is lower than the output voltage VL (source voltage of the FET M7) (FIG. 7B) of the center tap between the secondary coils L2 and L3, and thus the FET M7 is in the OFF state.

Therefore, when a surge occurs in the drain-to-source voltage Vds of the rectifying device M5, a current Id (FIG. 7F) that includes the surge voltage flows through the diode D2, and reaches the capacitor C2, where the current Id is stored, and a charged voltage VC (FIG. 7D) of the capacitor C2 increases.

When the drain-to-source voltage Vds (FIG. 7A) of the rectifying device M5 falls in synchronization with the switching of the bridge circuit 13 (FIG. 1), the control signal Vgs7 (FIG. 7C) for the FET M7 takes on an ON state, and increases. Therefore, the control signal Vgs7 (FIG. 7C) is higher than the output voltage VL (source voltage of the FET M7) (FIG. 7B) of the center tap between the secondary coils L2 and L3, and the FET M7 is turned on.

When the FET M7 is turned on, the capacitor C2 discharges the current, and the discharge current Ifet (FIG. 7E) of the capacitor C2 flows to the choke coil L5 via the FET M7. Accordingly, the charged voltage VC (FIG. 7D) of the capacitor C2 decreases.

When the control signal Vgs7 (FIG. 7C) for the FET M7 is in the OFF state, and shows a voltage that is lower than the output voltage VL (source voltage of the FET M7) (FIG. 7B) of the center tap between the secondary coils L2 and L3, the FET M7 is turned off. Hereinafter, a description of the rectifying device M6 side is given. The same operation as that of the above-described rectifying device M5 is carried out, and the operations of the rectifying devices M5 and M6 are carried out alternately.

Figure 8:
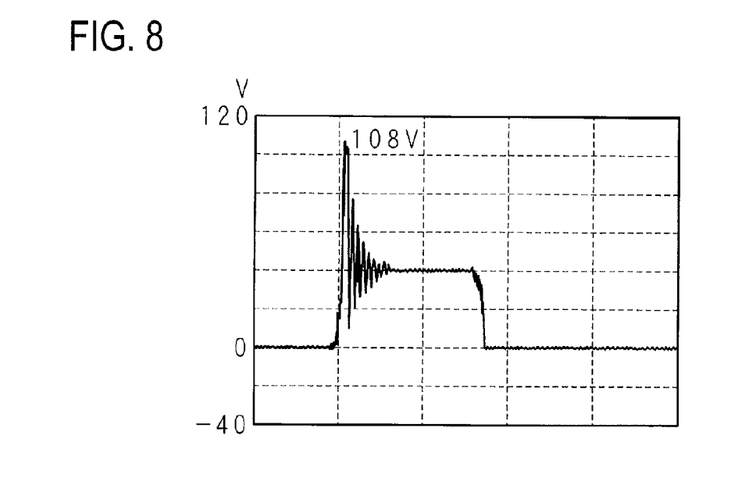
FIG. 8 shows waveform charts illustrating examples of operation of a switching power supply.

As described above, the current Id (FIG. 7F) that includes the surge voltage flows through the diode D2 and is stored in the capacitor C2, so that it is possible for the surge voltage to be suppressed to approximately 68 V (see FIG. 7A). In the case of a switching power supply that does not include the diodes D1, D2 and the capacitor C2, as shown in FIG. 8, the surge voltage reaches approximately 108 V.

Embodiment 2

Figure 9:
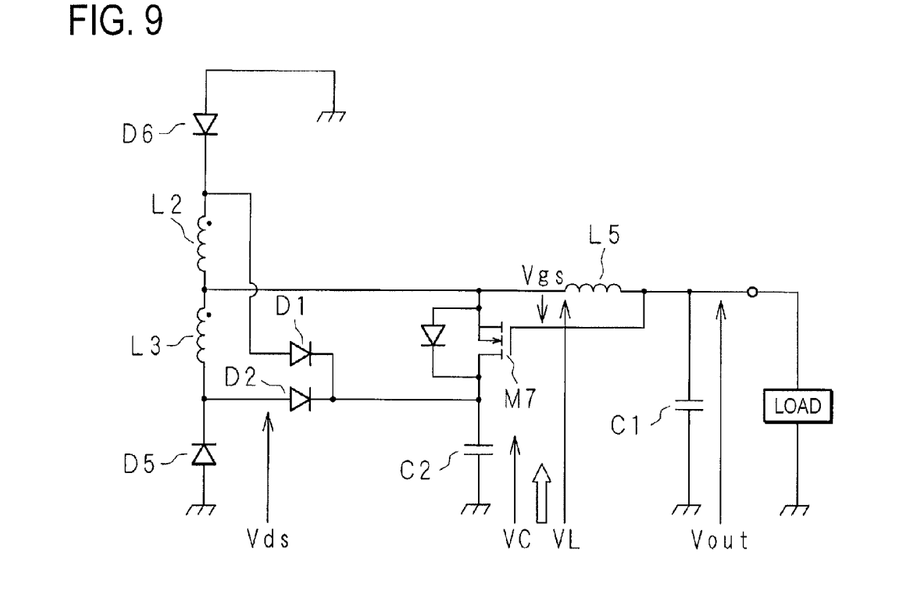
FIG. 9 is a circuit diagram illustrating a configuration of a main portion of the switching power supply according to an embodiment.

FIG. 9 is a circuit diagram illustrating a configuration of the main portion of a switching power supply according to Embodiment 2.

In this switching power supply, an AC voltage that is input from an H-shaped bridge circuit 13 (not shown, see FIG. 1) that includes four N-channel MOSFETs (switches) M1 to M4 is applied to a primary coil L1 (not shown, see FIG. 1) of a transformer 14, and a voltage that is transformed by the transformer 14 is output from a center tap between secondary coils L2 and L3.

First ends of the respective coils L2 and L3 are connected to each other by the center tap and, to the second ends of the respective coils L2 and L3, cathodes of diodes D6, D5, instead of the rectifying devices M6, M5 (FIG. 1), are connected, and anodes of the diodes D6, D5 are grounded.

The gate of a FET (second switch) M7 is connected to an output-side terminal of a choke coil L5, instead of the control signal generation unit 11 (FIG. 1). The FET M7 is switched on/off by a gate-to-source voltage Vgs (voltage between both ends of the choke coil L5).

Other configurations of this switching power supply are similar to those of the switching power supply (FIG. 1) described with respect to Embodiment 1, and thus the same reference numerals are given to the same portions, and descriptions thereof are omitted.

Hereinafter, operation of the switching power supply that has such a configuration will be described with reference to the timing flowcharts of FIG. 10.

Similarly to the switching power supply described in Embodiment 1, the H-shaped bridge circuit 13 (FIG. 1) switches the FETs M1 and M4 and the FETs M2 and M3 on/off at a predetermined cycle, and generates an AC voltage at the primary coil L1 of the transformer 14 at a predetermined cycle, which induces—at the secondary coils L2 and L3—AC voltages that correspond to the winding ratios of the secondary coils L2 and L3.

Here, when the voltages at the ends of the secondary coils L2 and L3 that are opposite to the center tap side have negative values, a current flows to the secondary coils L2 and L3 from the ground side through the diodes D6, D5. The voltages at ends of the secondary coils L2 and L3 are maintained at approximately 0 V. Therefore, the voltage at the center tap increases by voltages at the ends that should have been negative values, and thus a full wave rectified DC voltage is generated at the center tap.

Figure 10:
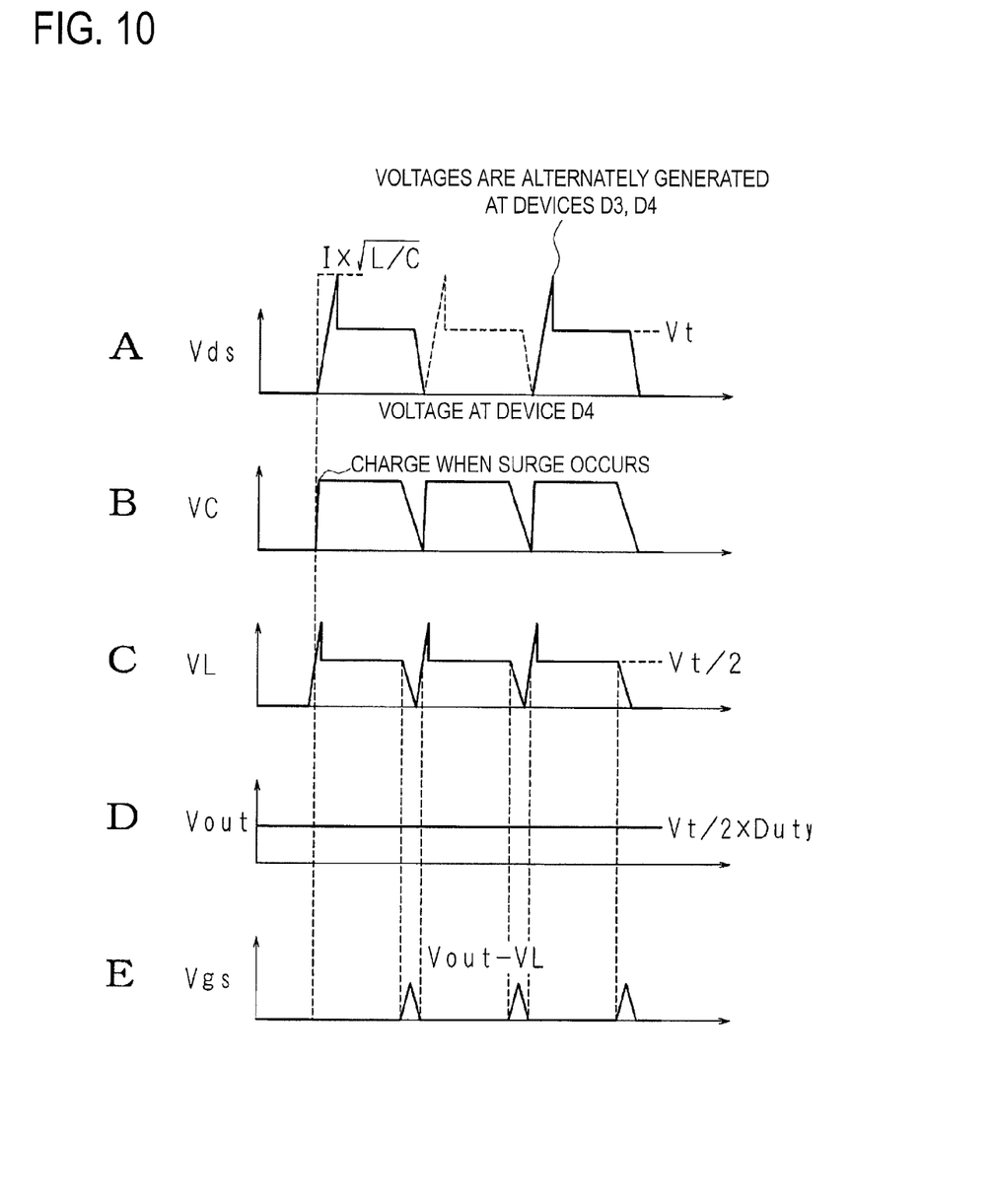
FIG. 10 shows timing flowcharts illustrating examples of operation of the switching power supply.

As shown in FIG. 10A, surges occur in the voltage Vds between both ends of the diode D5 at that time, for example, on the positive voltage side at timings at which the FETs M1 and M4, and the FETs M2 and M3 (FIG. 1) are switched on/off and the direction of the current of the primary coil L1 of the transformer 14 is switched. The surge voltage is expressed by $I \times \sqrt{L/C}$, where I represents the current that flows through the secondary coils L2 and L3, L represents the combined inductance of the secondary coils L2 and L3, and C represents the combined capacitance of the secondary coils L2 and L3.

Also, as shown in FIG. 10C, the voltage VL of the center tap between the secondary coils L2 and L3 is half as high as the voltage Vds (=Vt) (FIG. 10A) between both ends of the diode D5.

At that time, a current that includes the surge voltage flows through the diode (second diode) D2 and is stored in the capacitor C2, and a charged voltage VC that is charged in the capacitor C2 changes as shown in FIG. 10B. The capacitor C2 immediately takes on a fully charged state and thereafter no voltage is charged until the capacitor C2 is discharged.

The capacitor C2 needs to discharge the charged voltage by the time when the direction of the current of the primary coil L1 is next switched and a surge occurs in the voltage Vds between both ends of the diode D6 on the positive voltage side.

In order to do so, as shown in FIG. 10C, the FET M7 is just turned on at a timing at which the voltage VL of the center tap between the secondary coils L2 and L3 falls. The capacitor C2 discharges the current.

Although, as described above, the voltage VL (FIG. 10C) of the center tap between the secondary coils L2 and L3 falls in a cyclic manner, this voltage VL is smoothed by the smoothing circuit, that is, by the choke coil L5 and the capacitor C1 (see FIG. 10D), and is output as an output voltage Vout that is lower than the voltage VL (=Vt/2) of the center tap.

Since this output voltage Vout (output terminal voltage of the choke coil L5) is supplied to the gate of the FET M7, the gate-to-source voltage Vgs (both end voltage of the choke coil L5=Vout−VL) of the FET M7 takes on a positive value as shown in FIG. 10E, when the source voltage (voltage VL of the center tap) of the FET M7 falls.

By the gate-to-source voltage Vgs having a positive value, the FET M7 is turned on, and the capacitor C2 discharges the current through the FET M7 and the choke coil L5. This means that the energy of the surge voltage stored in the capacitor C2 is emitted as an output of the switching power supply when the current flows back to the choke coil L5, thereby preventing an increase in loss and suppressing a surge voltage.

Since the gate-to-source voltage Vgs of the FET M7 will have shown a value that is equal to or less than 0 and the FET M7 will have already turned off by the time the direction of the current of the primary coil L1 is next switched and a surge occurs in the voltage Vds between both ends of the diode D6 on the positive voltage side, the charges—including the surge voltage—are thus stored in the capacitor C2.

The invention claimed is:

1. A switching power supply comprising:
   a bridge circuit that includes a plurality of switches, and is configured to convert an input DC voltage into an AC voltage by switching;
   a transformer to whose primary coil the AC voltage converted by the bridge circuit is applied, and that is configured to output the transformed voltage from a center tap between secondary coils of the transformer;

two second switches for respectively causing two ends of the secondary coils to be brought in contact with and be separated from a fixed electrical potential, and a smoothing circuit that smoothes the voltage output from the center tap, wherein a rectified DC voltage is output from the center tap by the second switches being respectively switched on/off with control signals synchronized with the switching, and the DC voltage smoothed by the smoothing circuit is output from the switching power supply, and wherein the switching power supply further comprising:

two diodes that are respectively connected to the two ends of the secondary coils, and are configured to cause currents to flow from the two ends;

a capacitor that is configured to store the currents caused to flow by the diodes; and a third switch that is connected between the capacitor and the center tap, wherein the capacitor is discharged to the smoothing circuit by the third switch being turned on with a second control signal synchronized with the switching.

2. The switching power supply according to claim 1, wherein the second control signal is generated based on switched parts of the control signals.

3. A switching power supply comprising:

a bridge circuit that includes a plurality of switches, and is configured to convert an input DC voltage into an AC voltage by switching;

a transformer to whose primary coil the AC voltage converted by the bridge circuit is applied, and that is configured to output the transformed voltage from a center tap between secondary coils of the transformer;

two diodes whose cathodes are connected to two ends of the secondary coils and whose anodes are connected to a fixed electrical potential; and a smoothing circuit that smoothes the voltage output from the center tap, wherein the DC voltage smoothed by the smoothing circuit is output from the switching power supply, wherein the switching power supply further comprising:

two second diodes that are respectively connected to the two ends of the secondary coils, and are configured to cause currents to flow from the two ends;

a capacitor that is configured to store the currents caused to flow by the second diodes; and a second switch that is connected between the capacitor and the center tap, wherein the capacitor is discharged to the smoothing circuit by the second switch being turned on in synchronization with the switching.

4. The switching power supply according to claim 3, wherein the smoothing circuit is provided with a coil that smoothes a current from the center tap, and the second switch is turned on by a voltage between both ends of the coil.

* * * * *